L. A. SHELDON.
BEARING FOR FLOW METERS.
APPLICATION FILED AUG. 15, 1914.
1,157,331.
Patented Oct. 19, 1915.
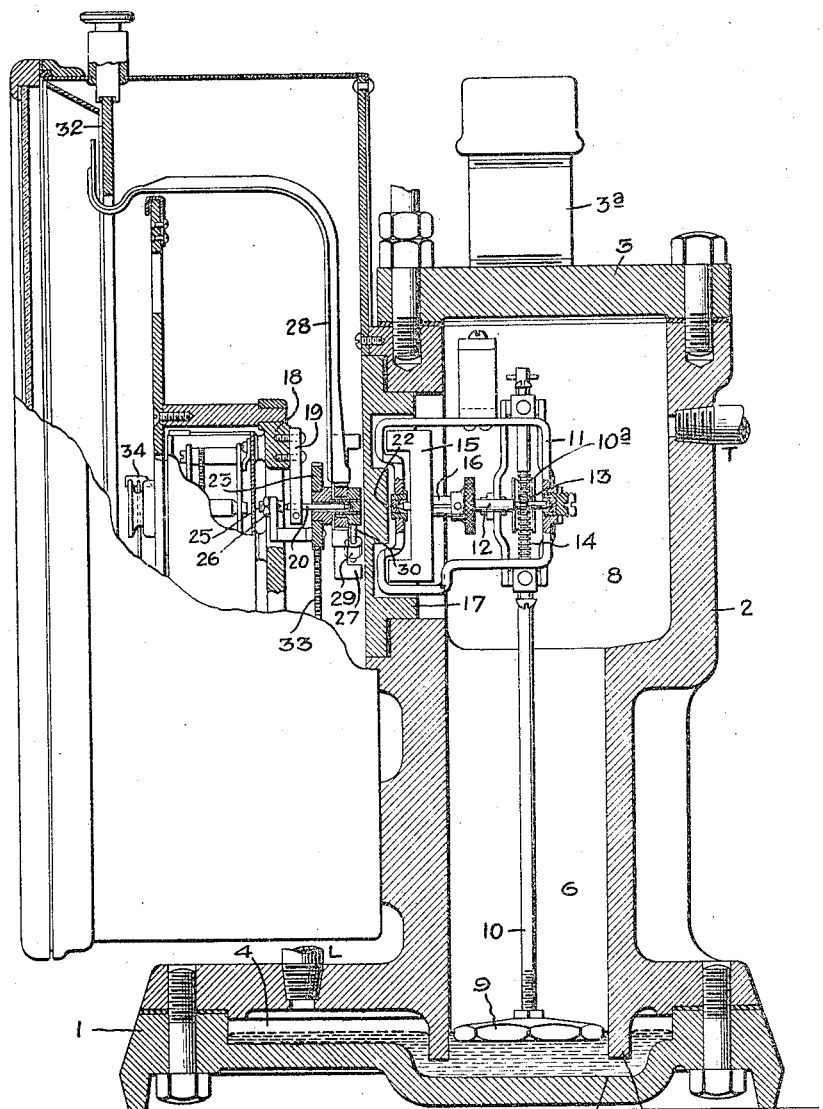
Fig. 1.
Fig. 2.
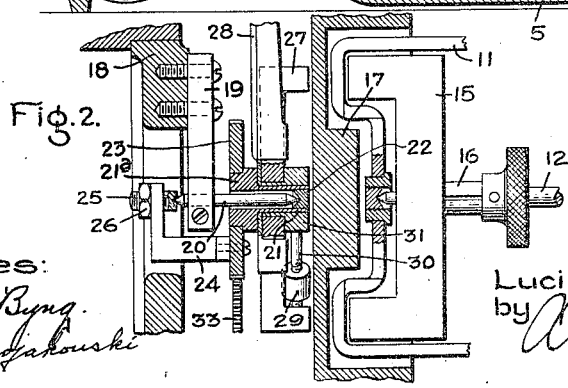
Witnesses:
Marcus L. Byng.
Edmund Trojakowski.
Inventor:
Lucian A. Sheldon,
by
His Attorney.

UNITED STATES PATENT OFFICE.

LUCIAN A. SHELDON, OF SCHENECTADY, NEW YORK, ASSIGNOR TO GENERAL ELECTRIC COMPANY, A CORPORATION OF NEW YORK.

BEARING FOR FLOW-METERS.

1,157,331.

Specification of Letters Patent.

Patented Oct. 19, 1915.

Application filed August 15, 1914. Serial No. 856,953.

*To all whom it may concern:*

Be it known that I, LUCIAN A. SHELDON, a citizen of the United States, residing at Schenectady, county of Schenectady, State of New York, have invented certain new and useful Improvements in Bearings for Flow-Meters, of which the following is a specification.

This invention relates to meters for determining the flow of fluids, such for example, as steam, air, water, etc. The meter to which the invention especially applies is one of the type disclosed in the patent to Austin R. Dodge, No. 1,118,403, dated November 24, 1914, and the subject matter of the present invention is an improved bearing for carrying certain of the moving parts including the indicating needle which coöperates with the graduated dial of the instrument. In the above mentioned patent, these moving parts are carried on a sleeve rotatable on a fixed stud projecting from a bracket in front of the pressure chamber. While this construction is entirely satisfactory in operation, yet it has been found that when the meter is shipped these parts may become disarranged, and the object of my invention is to afford a construction which will stand shipment better, and be easier to adjust and repair in case of necessity.

In the accompanying drawing, Figure 1 is a sectional side elevation of a meter embodying my invention, and Fig. 2 is a view of the bearing on a larger scale.

The meter has a casing or body comprising a base 1, an upright member 2 and a cap 3. In the base is formed a reservoir 4 which is provided with a well 5 and contains mercury or some other suitable liquid. The member 2 has a cylindrical chamber 6 in it which communicates with the reservoir, the lower end of the chamber having a wall 7 that projects into the well 5. The liquid in the reservoir, well and chamber thus has substantially the form of a U-shaped column, although one end of the column is approximately annular while the other end is circular. The annular end has a larger area than the circular end, so that a relatively small movement of the annular end causes a much larger movement of the other end of the column. The upper part of the chamber 6 opens into an enlarged chamber 8 that is closed by the cover 3. Riding on the end of the liquid column in the chamber 6 is a float 9 that is mounted on the lower end of a rod 10. The edge of the float is grooved longitudinally, being preferably engrailed as shown so that the surface tension of the liquid tends to keep the float in a central position in the chamber 6 and thus avoid the friction which might result from crowding the float to one side as it moves. Secured to the wall of the chamber 8 is a frame 11 in which is mounted a spindle 12. On the right end of the spindle, Fig. 1, is a pinion 13 that meshes with a circular rack 14 on the rod 10. The upper portion of the rod passes freely through openings in the frame 11, while a guide wheel 10 carried by the frame engages the rod opposite the pinion 13 and keeps the rack in mesh with the pinion. The structure just described permits the rack to swing freely and to turn but at the same time keeps it in engagement with the pinion. The cover 3 has a tubular extension 3ª to permit the end of the rod 10 to pass up through the cover if the float rises sufficiently. The left end of the spindle 12 carries a U-shaped magnet 15 which is secured to it by a friction sleeve 16 so that the relation of the parts can be adjusted if desired. When the casing is made of iron or other magnetic material, a plug 17 of non-magnetic material is secured in the wall of the casing opposite the magnet. Up to this point, the mechanism is identical with that shown in the aforesaid Dodge patent. The specific improvement which I have invented will now be described.

Secured to a portion of the framework 18 is a bar 19 in the lower end of which is rigidly fixed the horizontal pin 20 having pointed ends serving as journals. Loosely surrounding the pin is a sleeve 21 in one end of which is secured a bearing block 22 engaging one end of the pin. A gear wheel 23 is attached to a hub 21ª on the sleeve and concentric with the pin. An arm 24 projecting from the wheel and extending radially inward thereof carries a stud 25 in whose end is a bearing in axial alinement with the wheel and sleeve, and adapted to receive the pointed journal at the other end of the pin. The stud is adjustable, preferably by being screw threaded and inserted in a tapped hole in the arm 24. A lock nut 26 retains the stud in place. On the sleeve, besides the gear wheel 23 is fixed a U-shaped magnet 27 with its poles arranged opposite the poles of the magnet 15. The first magnet moves the second without any mechanical connection between them and obviates the use of a packed spindle passing through the wall of the pressure chamber. The sleeve 21 also carries an indicator or pointer 28 and an adjustable weight 29 for balancing it; the latter being preferably a nut mounted on a screw threaded rod 30 projecting radially from a hub 31 on a second sleeve concentric with the sleeve 21. The outer end of the pointer is brought into operative relation with a suitable dial 32.

The gear wheel 23 meshes with a sector gear 33 which through suitable mechanism operates a pin or marker 34 for making a permanent record of the fluctuations of the flow.

It will be observed that the pointer, gear wheel and magnet are securely journaled on the pin, which in turn is held rigidly in the end of the bar 19, and that this entire structure can be readily removed from the meter by detaching the bar from the framework 18, without disturbing any of the other parts. It can also easily be put in place by one who is not a skilled workman, so that repairs and replacements can be attended to without returning the meter to the factory.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a meter having oscillatory parts for transmitting motion, pivotal means for said parts comprising a bar detachably secured to the framework of the meter, a pin fixed to said bar and projecting on opposite sides thereof, a sleeve surrounding the pin on one side of the bar, and means forming pivots for pivoting the sleeve on the two ends of the pin.

2. In a meter having oscillatory parts for transmitting motion, pivotal means for said parts comprising a bar detachably secured to the framework of the meter, a pin fixed to said bar, a sleeve which surrounds the pin and carries said parts, and means carried by the sleeve and having bearings which engage the ends of the pin to pivot the sleeve on the pin.

3. In a meter having oscillatory parts for transmitting motion, pivotal means for said parts comprising a bar detachably secured to the framework of the meter, a pin fixed to said bar, a sleeve which surrounds the pin and carries said parts, a bearing carried by one end of the sleeve which engages one end of the pin, and a member fixed to the sleeve and carrying a bearing for the other end of the pin.

4. In a meter for measuring the flow of liquids, the combination with the dial and pointer, of a bearing for the latter comprising a bar detachably secured to the framework of the meter, a pin rigidly secured to said bar and having pointed ends, a sleeve carrying the pointer and surrounding said pin, a block at one end of the sleeve containing a bearing for one end of the pin, and an arm connected to said sleeve and carrying a bearing engaging the other end of the pin.

5. In a meter for measuring the flow of liquids, the combination with the dial and pointer, of a bearing for the latter comprising a bar detachably secured to the framework of the meter, a pin rigidly secured to said bar and having pointed ends, a sleeve carrying the pointer and surrounding said pin, a block at one end of said sleeve containing a bearing for one end of said pin, a gear wheel mounted on the sleeve, an arm connected with said gear, and an adjustable stud in said arm containing a bearing for the other end of said pin.

6. As a complete and removable structure forming part of a meter for measuring the flow of liquids, the combination with a bar, of a pin rigidly secured thereto and having pointed ends, a sleeve surrounding said pin, a bearing block in one end of the sleeve, a gear wheel mounted on said sleeve, an arm secured to said wheel, a screw-threaded stud in the end of the arm containing a bearing, a U-shaped magnet carried by the sleeve, a pointer mounted on the sleeve, and a weighted balancing arm also mounted on said sleeve.

7. In a meter, the combination with a sleeve, of a bearing in one end of said sleeve, an oscillating member secured to said sleeve, an arm secured to said member, and a bearing in said arm in axial alinement with the member and sleeve.

8. In a meter, the combination with a sleeve of a bearing in one end of said sleeve, a wheel secured to the other end thereof, an arm secured to said wheel and extending radially inward thereof, and a bearing carried by said arm in axial alinement with the sleeve.

In witness whereof, I have hereunto set my hand this 14th day of August, 1914.

LUCIAN A. SHELDON.

Witnesses:
MARGARET E. WOOLLEY,
HELEN ORFORD.